Feb. 18, 1958 R. F. HARRINGTON 2,823,965
BEARING
Filed July 20, 1955

INVENTOR.
Richard F. Harrington
BY Olson & Trexler
Attys.

United States Patent Office 2,823,965
Patented Feb. 18, 1958

2,823,965
BEARING

Richard F. Harrington, Davenport, Iowa, assignor to Parkersburg-Aetna Corporation, Chicago, Ill., a corporation of West Virginia Application July 20, 1955, Serial No. 523,217
7 Claims. (Cl. 308—187.1)

The present invention relates to a novel bearing structure, and more particularly to a novel anti-friction bearing structure of the type having a sealed bearing chamber which may be filled with a lubricant.

While many uses will suggest themselves for the novel bearing structure of the present invention, it is particularly adapted to be utilized in installations wherein it will be subjected to the action of dirt, rocks, or other foreign material.

For example, bearing units of the present invention may be utilized as disc harrow bearings as well as in various other installations involving agricultural equipment or the like.

An important object of the present invention is to provide a novel bearing structure or unit of simple and economical construction and having a bearing chamber sealed in a manner which protects the anti-friction element and seal means so that the bearing unit may be utilized in installations such as those mentioned above wherein it is exposed to dirt, rocks and the like.

A more specific object of the present invention is to provide an improved sealed anti-friction bearing unit that is provided with simple and economical seal means which may be readily assembled in a position so that it is protected against being engaged and injured by dirt or other foreign material.

A further more specific object of the present invention is to provide a novel bearing unit of the above described type which is provided with relatively soft resilient seal rings substantially enclosed by metal parts of the structure so that the rings are protected against injury, which rings and metal parts are constructed so that the rings may be readily assembled with the metal parts and retained in position without the aid of auxiliary retaining devices.

Other objects and advantages of the present invention will become apparent from the following descripton and the accompanying drawings wherein.

Figure 1:
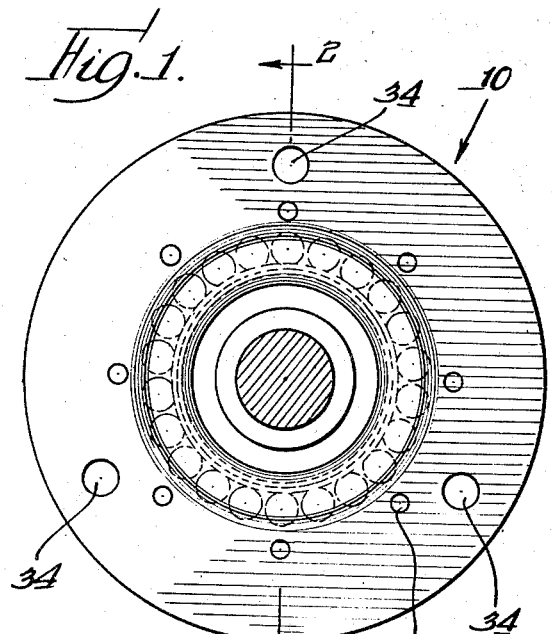
Fig. 1 is an elevational view showing a bearing unit embodying the principles of this invention.
Figure 2:
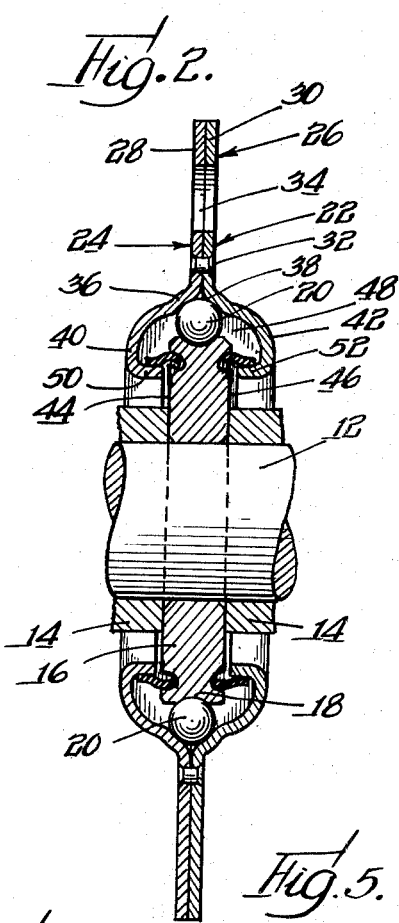
Fig. 2 is a cross sectional view taken along line 2—2 in Fig. 1.
Figure 3:
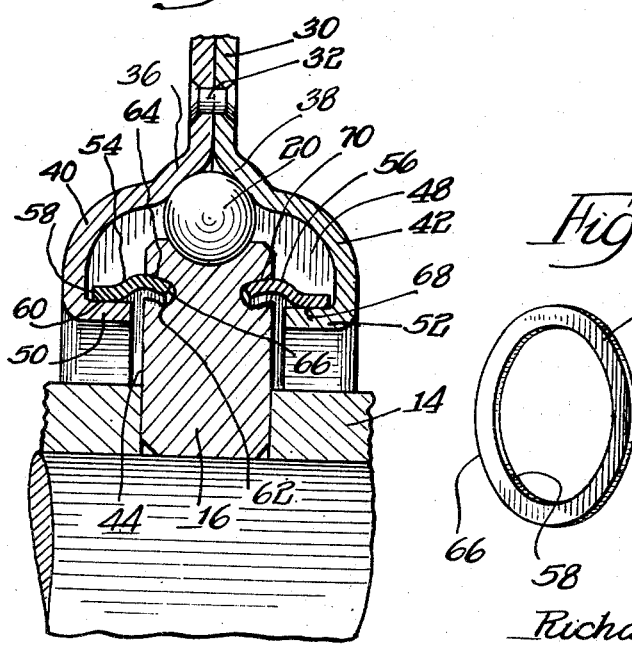
Fig. 3 is an enlarged fragmentary cross sectional view showing a portion of the structure in greater detail.

Referring now more specifically to the drawings wherein like parts are designated by the same numerals throughout the various figures, a bearing unit 10 embodying the principles of the present invention is shown surrounding a shaft 12 and retained against axial movement by spacing blocks 14. As will be understood, the shaft 12 may be a part of any desired machinery or equipment, and may either support the bearing unit or be supported by the bearing unit. The outer margin of the bearing unit may either be secured to suitable frame means when the bearing is to support the shaft, or secured to a member to be rotatably supported when the bearing unit is carried by the shaft.

The bearing unit 10 comprises an apertured hub member 16 adapted to receive the shaft 12. It will be appreciated that the shaft 12 may have either a circular cross section or a non-circular cross section, and the aperture through the hub member 16 will be shaped to conform to the shaft to be received. The outer periphery of the hub member 16 is formed with an annular groove 18 and provides an inner ball race for receiving a plurality of anti-friction or ball elements 20. Annular disc means 22 surrounds the hub member and provides an outer race for the elements 20.

The disc means 22 comprises a pair of annular disc members 24 and 26 which are preferably formed from sheet metal. The disc members are respectively provided with outer abutting annular portions 28 and 30 that are rigidly secured to each other by a plurality of rivets 32 or any other desired fastening means. A plurality of openings 34 is provided through the disc portions 28 and 30 for receiving bolts or the like, not shown, adapted to connect the bearing unit to a frame member of the machinery or a member to be rotatably supported, which members are not shown. Flaring outwardly and oppositely from inner margins of the disc portions 28 and 30 are annular sections 36 and 38 which are curved in radial cross section and complement each other to provide the outer bearing race. Annular disc sections 40 and 42 extend outwardly and inwardly from the sections 36 and 38 respectively and along opposite end surfaces 44 and 46 of the member 16 to provide a bearing chamber 48 which may be packed with a lubricant. The wall sections 40 and 42 respectively merge with inturned generally axially extending flanges 50 and 52 which terminate adjacent to but spaced from the end surfaces 44 and 46 of the hub or inner bearing race member 16.

Figures 4, 5:
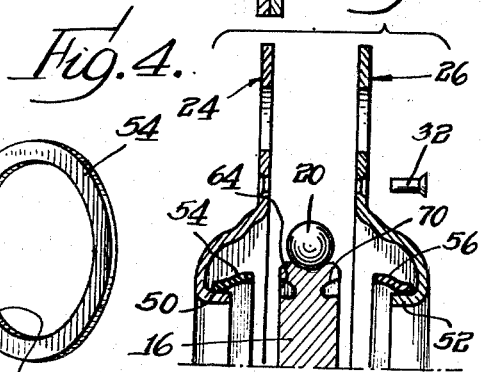
Fig. 4 is a perspective view of a seal ring utilized in the bearing unit of the present invention.
Fig. 5 is a partially exploded sectional view showing the manner in which the elements of the bearing unit are assembled.

In order to prevent the lubricant from escaping from the bearing chamber 48 as well as to prevent dirt and other foreign material from entering the chamber, seal means which includes a pair of seal rings 54 and 56 is provided. The seal rings 54 and 56 are made of flexible and resilient rubber or synthetic rubber-like material, and as shown in Fig. 4, they are initially formed so that they have a flattened radial cross section. Referring particularly to the seal ring 54, it should be noted that the normal diameter of its inner margin 58 is less than the outer diameter of the flange 50 so that when the seal ring is assembled in the manner shown, the inner margins 58 will tightly engage the radially outermost surface 60 of the flange 50 with sufficient force so that the seal ring will remain fixed with respect to the flange 50 and will slide relative to the inner bearing race. In order to provide a seal between the ring 54 and the bearing member 16, an annular recess 62 is formed in the surface 44 of the member 16 so as to provide a generally radially inwardly facing annular surface or seat 64 cooperable with an outer marginal portion 66 of the seal ring 54. It should be noted that the normal outer diameter of the seal ring 54 is greater than the diameter of the seat 64 so that the outer marginal portion of the ring firmly presses against the seat. With this structure the internal stress set up in the seal ring maintains the ring in contact with the surfaces 60 and 64 so that it is unnecessary to provide any separate means for retaining the seal ring. It should be especially noted that in accordance with a feature of the present invention, the seal ring 54 is substantially completely enclosed by the relatively tough wear resisting metal portions of the bearing unit, and that the surfaces 60 and 64 are also disposed substantially within the interior of the unit whereby the elements of the sealing means are protected against direct impact or engagement by dirt, rocks or other foreign material. Furthermore, any dirt or the like which may pass between the end of the flange 50 and the member 16 cannot easily lift the ring 54 from the surface 60 since the ring rotates with this surface, and such dirt may press the ring 54 against the seat 64 so as to make the seal therebetween even more secure. The sealing ring 56 is formed in the same manner as the ring 54 for engagement with surfaces 68 and 70 which correspond to the above described surfaces 60 and 64, and, therefore, this seal ring and these sealing surfaces need not be described in detail. As shown in Fig. 5, the bearing unit is assembled by first stretching the seal rings over the flanges 50 and 52 and then bringing the disc members 24 and 26 together after the bearing balls 20 have been placed around the inner bearing race.

From the above description it is seen that the present invention has provided a novel bearing unit which is of extremely simple and economical construction and which includes a bearing chamber sealed in a manner that permits the unit to be used for long periods even when subjected to the action of dirt, rocks, and the like. It should also be noted that the sections 40 and 42 of the disc means are formed so as to provide the lubricant chamber with a relatively large capacity so as to promote use of the bearing unit for long periods without any need for relubrication. In addition, as a result of the novel sealing arrangement and the inherent flexibility of the seal rings, the sealing surfaces of the rings will always be in intimate contact with the sealing surfaces 60, 64, 68 and 70 even under conditions of shaft misalignment, or in other words, even when the inner bearing race is out of axial alignment with the disc means 22.

While the preferred embodiment of the present invention has been shown and described herein, it is obvious that many structural details may be changed without departing from the spirit and scope of the appended claims.

The invention is claimed as follows:

1. A bearing unit comprising an inner bearing race member adapted to receive a shaft or the like, annular means providing an outer bearing race surrounding said inner bearing race member, a plurality of anti-friction elements disposed between said inner and outer bearing races, said annular means including a pair of axially spaced annular wall sections extending inwardly from said outer bearing race and along opposite end surfaces of said inner member, said inner member having radially inwardly facing annular shoulders of predetermined diameter at said opposite end surfaces, said wall sections including radially outwardly facing annular surfaces having a diameter less than said predetermined diameter, and a pair of resilient seal rings respectively engaging said inwardly facing annular shoulders and adjacently disposed radially outwardly facing annular surfaces.

2. A bearing unit comprising an inner apertured bearing race member adapted to receive a shaft or the like, annular means providing an outer bearing race surrounding said inner bearing race member, a plurality of anti-friction elements disposed between and engaging said inner and outer bearing races, said annular means including a pair of axially spaced annular wall sections extending inwardly from said outer bearing race and along opposite end surfaces of said inner member, said inner member having annular recesses in said opposite end surfaces, each of which recesses is partially defined by a generally radially inwardly facing annular surface having a predetermined diameter, said annular wall respectively including means providing generally radially outwardly facing surfaces spaced axially from and having a diameter less than an adjacently disposed inwardly facing surface, and a pair of resilient seal rings respectively disposed between said adjacent generally radially inwardly and outwardly facing surfaces, said seal rings normally having an internal diameter less than the diameter of said generally radially outwardly facing surfaces and an external diameter normally greater than the diameter of said generally radially inwardly facing surfaces.

3. A bearing unit comprising inner bearing race means, annular means providing an outer bearing race means surrounding said inner bearing race means, a plurality of anti-friction elements disposed between said inner and outer bearing race means, said annular means comprising a pair of annular wall sections extending generally radially inwardly along opposite ends of said inner bearing race means, a pair of generally axially inwardly extending flange sections respectively joined to inner margins of said annular wall sections, said flange sections having radially outwardly facing surfaces with predetermined diameters, each of said inner bearing race means ends having an annular recess therein partially defined by a generally radially inwardly facing surface having a diameter greater than said predetermined diameter of an adjacent outwardly facing flange surface, and a pair of resilient annular seal rings respectively disposed between each pair of said adjacent outwardly and inwardly facing surfaces, each of said seal rings having an inner margin stretched over its associated outwardly facing surface and an outer margin compressed within its associated inwardly facing surface.

4. A bearing unit comprising inner bearing race means, a pair of annular sheet material disc members surrounding said inner bearing race means, means rigidly interconnecting said disc members, said disc members including oppositely flaring complementary portions providing outer bearing race means, a plurality of anti-friction elements disposed between said inner and outer bearing race means, said disc members comprising wall sections extending generally radially inwardly from said outer bearing race means along opposite ends of said inner bearing race means, said wall sections respectively terminating in generally axially inwardly extending annular flanges having generally radially outwardly facing surfaces with predetermined diameters, said inner bearing race means including annular generally radially inwardly facing surfaces at opposite ends thereof having diameters greater than said predetermined diameters, and a pair of resilient seal rings respectively having one margin engaging one of said flange surfaces and an opposite margin engaging an adjacent generally radially inwardly facing surface on the inner bearing race means.

5. A bearing unit, as defined in claim 4, wherein said annular wall sections are spaced substantially axially from said inner bearing race means so as to provide a lubricant chamber around said anti-friction elements of relatively large capacity.

6. A bearing unit, as defined in claim 4, wherein the outwardly and inwardly facing surfaces of each of said pairs of surfaces are axially offset from each other, each of said seal rings having a flattened radial cross section and being twisted so as to axially space its inner and outer margins for engagement with its associated outwardly and inwardly facing surfaces, said seal ring engaging said outwardly facing surfaces sufficiently aggressively to remain substantially fixed with respect thereto while sliding relative to said inwardly facing surfaces.

7. A bearing unit comprising an inner bearing member adapted to receive a shaft or the like, annular means providing an outer bearing member surrounding said inner bearing member and rotatable relative thereto, said annular means including an annular wall section extending inwardly from said outer bearing member and along an end surface of said inner member, said inner member having a radially inwardly facing shoulder of predetermined diameter at said end surface, said wall section including a radially outwardly facing annular surface having a diameter less than said predetermined diameter, and a resilient seal ring engaging said inwardly facing annular shoulder and adjacently disposed radially outwardly facing annular surface.

References Cited in the file of this patent

UNITED STATES PATENTS

| 1,231,366 | Irwin | June 26, 1917 |
| 2,712,966 | Brady et al. | July 12, 1955 |
| 2,712,969 | Spicacci | July 12, 1955 |
| 2,712,970 | Spicacci | July 12, 1955 |